Dec. 3, 1968 A. F. B. WOOD 3,414,794

TEMPERATURE COMPENSATING UNIT FOR PIEZOELECTRIC CRYSTALS

Filed June 8, 1966 5 Sheets-Sheet 1

Inventor
ALAN F. B. WOOD
By Percy P. Lantzy
Attorney

Dec. 3, 1968 A. F. B. WOOD 3,414,794

TEMPERATURE COMPENSATING UNIT FOR PIEZOELECTRIC CRYSTALS

Filed June 8, 1966 5 Sheets-Sheet 2

Inventor
ALAN F. B. WOOD
By Percy P. Lantzy
Attorney

TEMPERATURE COMPENSATING UNIT FOR PIEZOELECTRIC CRYSTALS

Filed June 8, 1966

Inventor
ALAN F. B. WOOD
By Percy P. Lantz
Attorney

Inventor
ALAN F. B. WOOD
By Percy P. Lantzy
Attorney

Dec. 3, 1968 A. F. B. WOOD 3,414,794

TEMPERATURE COMPENSATING UNIT FOR PIEZOELECTRIC CRYSTALS

Filed June 8, 1966 5 Sheets-Sheet 5

CURVE 1 UNCOMPENSATED A.T.-CUT CRYSTAL —·—·—

CURVE 2 COMPENSATOR — — —

CURVE 3 RESULTANT CURVE ————

Inventor
ALAN F. B. WOOD
By Percy P. Lantzy
Attorney

United States Patent Office 3,414,794

Patented Dec. 3, 1968

3,414,794

TEMPERATURE COMPENSATING UNIT FOR PIEZOELECTRIC CRYSTALS

Alan Frank Bernard Wood, London, England, assignor to International Standard Electric Corporation, New York, N.Y., a corporation of Delaware Filed June 8, 1966, Ser. No. 556,063
Claims priority, application Great Britain, June 14, 1965, 25,071/65
6 Claims. (Cl. 310—8.9)

ABSTRACT OF THE DISCLOSURE

A temperature compensated piezoelectric crystal circuit in which the frequency variations due to temperature changes are minimized, including a first piezoelectric crystal having a given frequency-temperature characteristic which is to be compensated, a second piezoelectric crystal having a frequency-temperature characteristic which is at least partially the inverse of that of the first crystal and an RC network coupled to said second crystal and augmenting the inverse characteristic thereof, said second crystal being in series combination with the resistor of the RC combination, and the capacitor being shunted across both the second crystal and resistor, the second crystal and the resistor being in series with the first mentioned piezoelectric crystal, thereby providing that the resonant frequency of the circuit will remain substantially constant over a given temperature operating range.

The invention relates to temperature-compensated piezoelectric crystal oscillators.

The invention provides a compensating unit for correcting frequency variations due to temperature changes in systems employing piezoelectric crystal oscillators, including at least one piezoelectric crystal having a prescribed frequency-temperature characteristic connected to the piezoelectric crystal to be compensated by a coupling circuit, wherein the reactance-temperature characteristic of the compensating unit and the associated coupling circuit is chosen such that the resonance frequency of the piezoelectric crystal oscillator is maintained substantially constant over a selected working temperature range.

According to one feature of the invention a compensating unit as detailed in the preceding paragraph is provided wherein the compensating unit may have either a linear or parabolic frequency-temperature characteristic, the particular frequency-temperature characteristic used being dependent on the characteristic of the piezoelectric crystal being compensated.

According to another feature of the invention a compensating unit as detailed in any one of the preceding paragraphs is provided wherein said coupling circuit includes temperature sensitive electrical components thereby further modifying the characteristics of the compensating unit to provide the desired frequency correction over a wider temperature range.

The foregoing and other features according to the invention will be understood from the following description with reference to FIGURES 1 to 5 and FIGURE 6 of the drawings which accompanied the provisional specification and to FIGURE 7 of the accompanying drawings which accompanied the provisional specification.

Figure 5A:
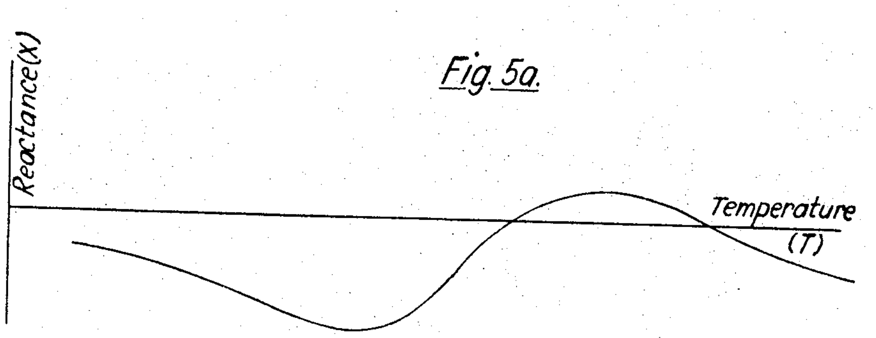

FIGURE 5*a* is the reactance-temperature curve for a crystal with a linear frequency-temperature characteristic and positive temperature-coefficient.

Figure 5B:
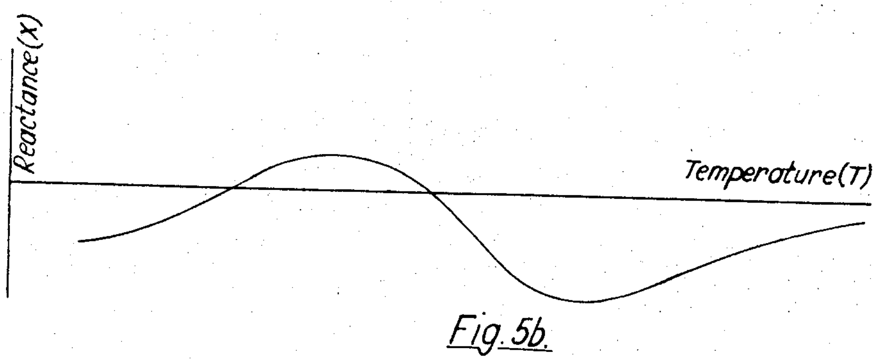

FIGURE 5*b* is the reactance-temperature curve for a crystal with a linear frequency-temperature characteristic and negative temperature-coefficient.

Figure 6A:
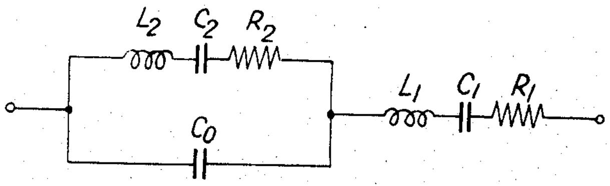

FIGURE 6*a* is an idealised equivalent circuit diagram of the compensated and compensating crystal units.

Figure 6B:
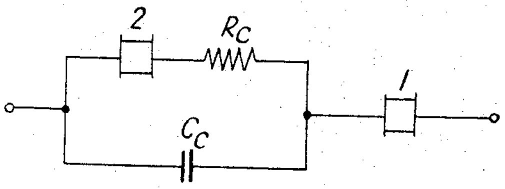

FIGURE 6*b* is a circuit diagram of the compensated and compensating crystal units.

Figure 6C:
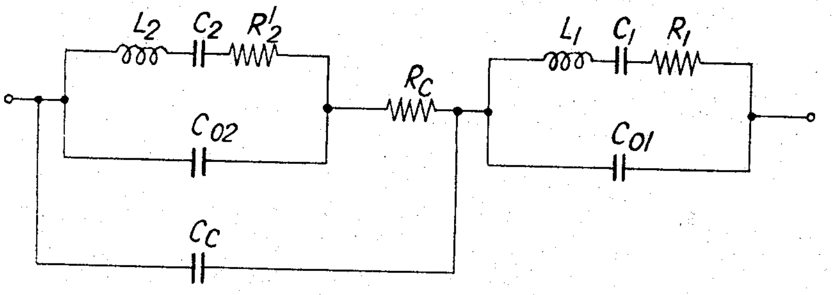

FIGURE 6*c* is the actual equivalent circuit diagram of the compensated and compensating crystal units.

Figure 1:
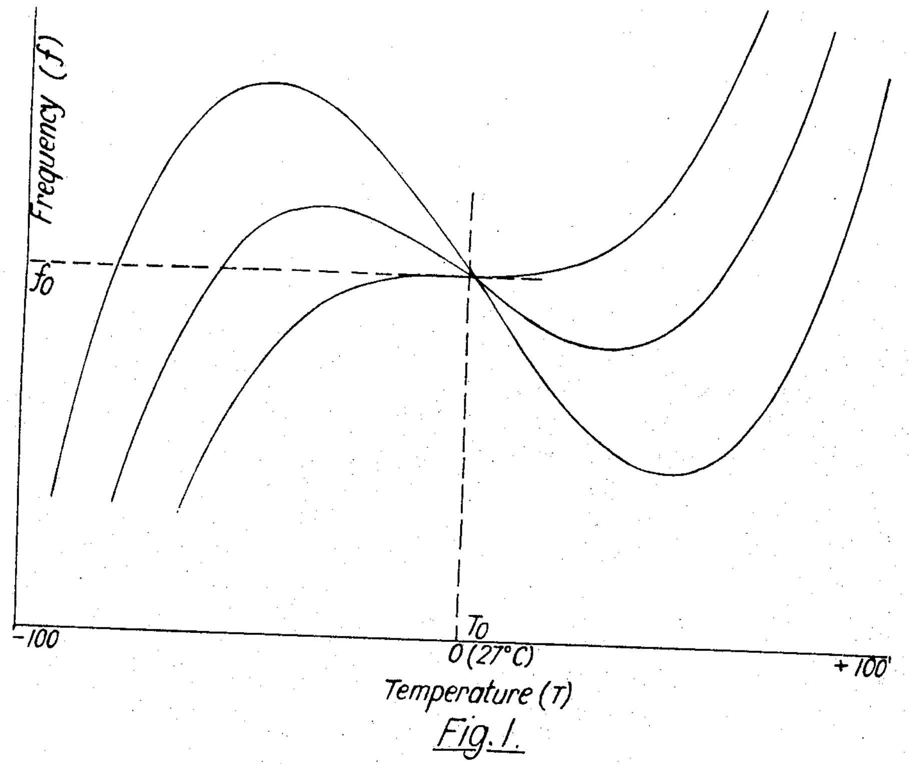
FIGURE 1 is a family of frequency-temperature curves for an AT-cut quartz crystal.
Figure 7:
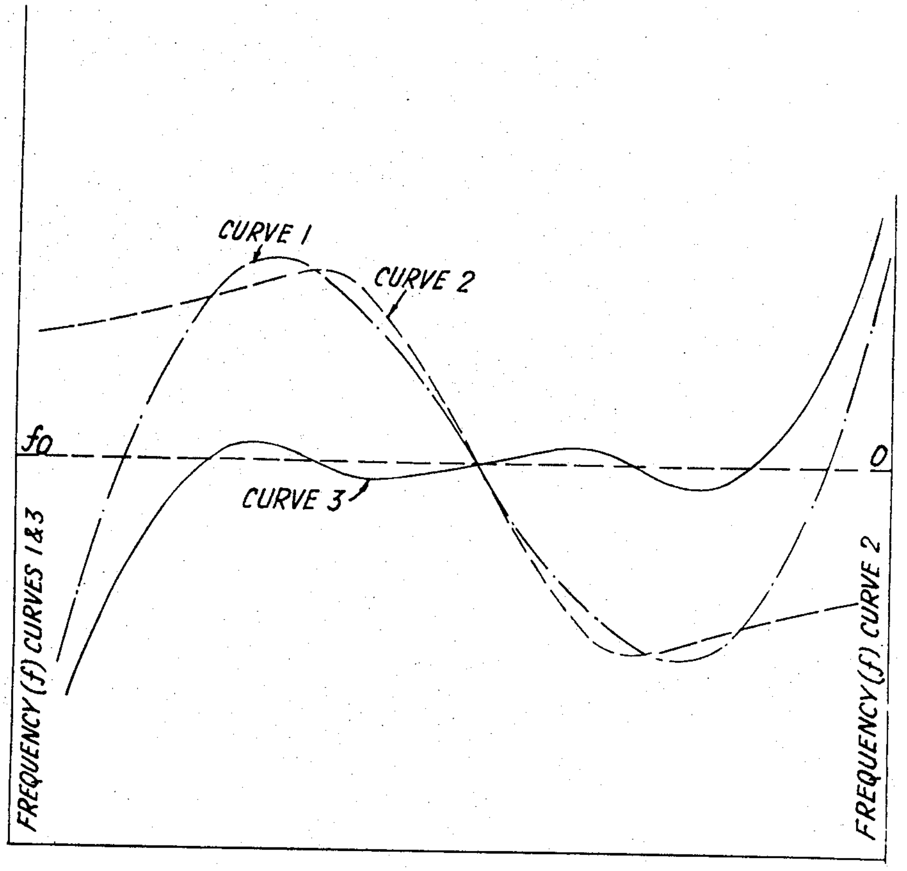

FIGURE 7 gives the relationship between the curve shown in the drawing according to FIGURE 1 and the frequency-temperature correction as derived from the drawing according to FIGURE 5*b*.

Referring to FIGURE 1, a family of frequency-temperature curves for an AT-cut quartz crystal is shown; the curves are approximately symmetrical about the point with co-ordinates $f_0$, $T_0$, where $f_0$ is the frequency of the crystal at the inflexion temperature $T_0$ (approximately 27° C. for the AT cut). The frequency $f$ can be expressed by the cubic equation $$f=f_0[1+a_1(T-T_0)+a_3(T-T_0)^3]$$

where:

T=the working temperature; and $a_1$ and $a_3$=parameters which are characteristics of the crystal unit and are determined largely by the physical properties of the quartz itself.

For a given crystal unit design, the different curves are obtained by slightly changing the angle at which the crystal element is cut from the quartz crystal. This results in a change of $a_1$ while $a_3$ remains substantially constant.

Figure 2:
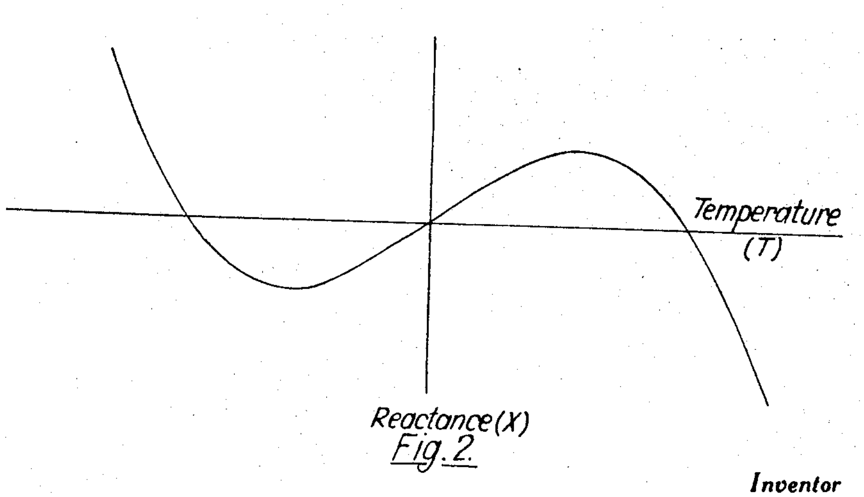
FIGURE 2 is a reactance-temperature curve for an AT-cut crystal, at a fixed frequency.

Referring to FIGURE 2, the reactance-temperature curve for an AT-cut crystal of one particular angle is shown for the frequency $f_0$. The reactance which, connected in series with the crystal, would bring the frequency back to $f_0$ is equal to the negative of the crystal reactance; thus FIGURE 2 gives also the necessary compensating reactance as a function of temperature for this particular angle of cut. The inverse of the curve according to FIGURE 2 is substantially identical in shape to the frequency-temperature curve from which it is derived since the crystal reactance is proportional to frequency deviation where this is small.

Figure 3:
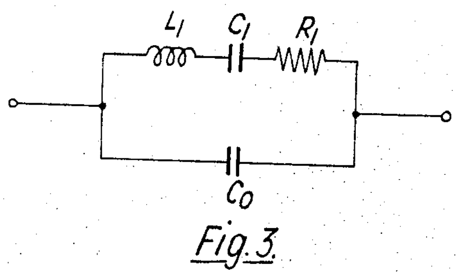
FIGURE 3 is the equivalent circuit diagram of a crystal.

The equivalent circuit diagram of a piezoelectric crystal is shown in FIGURE 3 and comprises an inductance $L_1$, capacitor $C_1$ and a resistor $R_1$ connected in series and shunted by a capacitor $C_0$. The series reactance necessary to bring the frequency back to the operating frequency which was described in the previous paragraph should strictly be inserted in the $L_1C_1R_1$ branch of the circuit but, in practice, since the necessary reactance is low compared with the reactance of $C_0$ it may be put in series with the crystal itself.

Figure 4:
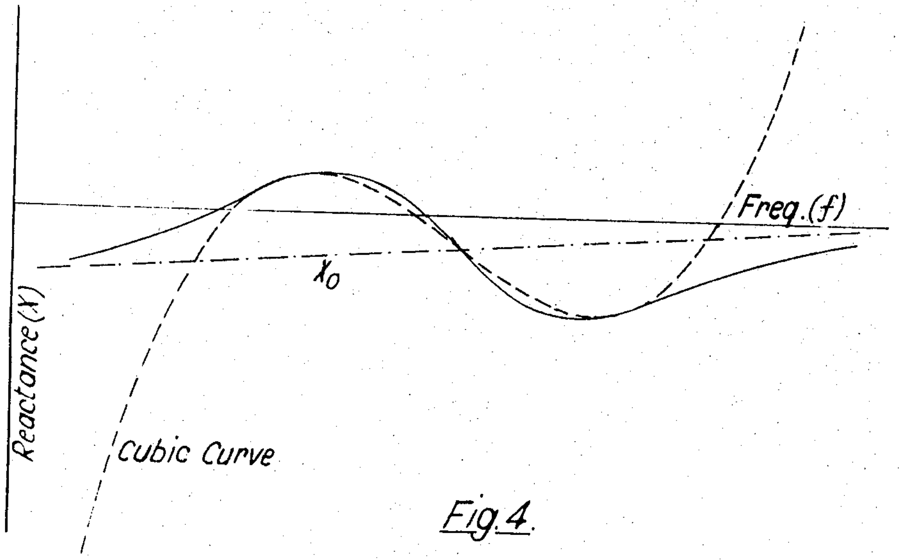
FIGURE 4 is the reactance-frequency curve for the equivalent circuit diagram according to FIGURE 3.

Referring to FIGURE 4, the reactance-frequency curve for the equivalent circuit diagram according to FIGURE 3 is shown; it can be seen that over a large portion of its length the curve has an essentially cubic shape, as shown by the broken line.

Referring to FIGURES 5*a* and *b*, the reactance-temperature curves shown are representative of crystals with linear frequency-temperature characteristics; the reactance at a fixed frequency as a function of temperature is shown for positive and negative crystal temperature coefficients respectively. The frequency excursion considered here is much larger than that considered in FIGURE 2 where the crystal frequency remained within the substantially linear part of the reactance-frequency curve of FIGURE 4, close to the zero reactance point having the lower frequency. The curve shown in FIGURE 5*b* is similar in shape to the inverse of the curve according to FIGURE 2 over a substantial temperature range; thus a suitable quartz crystal with a negative temperature coefficient connected in series with a crystal having a cubic frequency-temperature characteristic will provide a degree of temperature compensation over a selected working temperature range. To illustrate this, if the frequency-temperature curve according to one member of the family of curves shown in the drawing according to FIGURE 1 were representative of the compensated crystal and the frequency-temperature correction curve derived from FIGURE 5*b* were representative of the compensating crystal unit, the resulting frequency-temperature characteristic will be approximately the difference between these two curves, as shown in FIGURE 7.

To give some idea of the values of the circuit parameters it will be necessary to calculate the conditions necessary for the turning points of the curve according to FIGURE 2 to coincide with those of the curve according to FIGURE 5*b*. This is by way of example only and does not necessarily give the smallest overall frequency excursion over a given temperature band. A fuller analysis would be necessary to achieve the optimum conditions.

Referring to FIGURE 6*a*, an idealised equivalent circuit diagram of the compensated and compensating crystal units connected in series is shown. The equivalent circuit of the compensating unit comprises an inductance $L_2$, capacitor $C_2$ and resistor $R_2$ connected in series and shunted by a capacitor $C_0$; the equivalent circuit of the compensated unit comprises an inductance $L_1$, capacitor $C_1$ and resistor $R_1$ connected in series. The reactance X of the compensator varies between the limits $$X=-X_0\pm\frac{X_0^2}{2R_2} \tag{1}$$

at the turning points of the curve according to FIGURE 4, where $X_0$ is the reactance of $C_0$ at the mean frequency. The frequency difference between these points is given by $$\frac{\Delta\omega}{\omega}=\frac{1}{Q_2}=\frac{R_2}{\omega L_2} \tag{2}$$

where:

$\Delta\omega$=frequency difference radians.sec.$^{-1}$
$\omega$=mean frequency radians.sec.$^{-1}$
$R_2$=equivalent circuit resistance. Ohms.
$L_2$=equivalent circuit inductance. Henries.

If the compensator has a constant frequency-temperature coefficient such that $$f=f_0(1-aT) \tag{3}$$

where:

$f$=actual frequency at operating conditions.
$f_0$=frequency of crystal at zero temperature.
$a$=crystal temperature coefficient (° C.)$^{-1}$.
T=operating temperature.

then the temperature difference between the turning points of the curve in accordance with FIGURE 5*b* will be $$\Delta T=\frac{1}{a}\left(\frac{\Delta\omega}{\omega}\right)=\frac{1}{aQ_2} \tag{4}$$

from Equations 2 and 3.

where $\Delta T$=temperature difference ° C.

The change in frequency of the compensated crystal due to the reactance variation given by Equation 1 is given by $$2L_1\Delta\omega=\frac{X_0^2}{R_2} \tag{5}$$

where $L_1$=equivalent circuit inductance. Henries.

The equations give sufficient data to define the parameters of the compensator.

Since the required parameters will generally be outside the range of a real crystal unit, the equivalent circuit resistance $R_2$ and capacitance $C_0$ are adjusted to the required values by adding external components to the compensating crystal unit. Strictly, the additional resistance should be connected in series with the $L_2$, $C_2$ and $R_2$ branch of the equivalent circuit but provided the resistance $R_2$ is not too high compared with the reactance of the compensator shunt capacitance $C_{02}$ the circuit can be arranged as shown in FIGURE 6*b*, the full equivalent circuit being shown in FIGURE 6*c*.

Assume that two 10 mHz. ($f_0$) thickness-shear quartz crystal units are used, one having a normal AT-cut frequency-temperature characteristic with turning points at, say ±40° C. relative to the inflexion temperature of about 27° C. as shown in FIGURE 1 and a corresponding frequency variation of ±14 parts per million (at 10 mHz., $\Delta\omega$=1760 radians sec.$^{-1}$) and the other a high angle AT-cut with an approximately linear frequency-temperature characteristic and a temperature-coefficient equal to $-10\times10^{-6}$ (° C.)$^{-1}$. Furthermore, if both these crystals have a motional inductance of 15 millihenries (mh.), which is a typical value, then it follows from Equation 4 that $Q_2$ is equal to 1250 and since $L_2$ is equal to 15 mh., then $R_2$ must have a value of 755 ohms. From Equation 5, the reactance $X_0$ is equal to 200 ohms and so the capacitance $C_0$ is approximately equal to 80 picofarads (pf.).

The resistor $R_c$ shown in FIGURES 6*b* and 6*c* in practice will be equal to $(755-R'_2)$ ohms and the shunt capacitor $C_c$ shown in said figures will be equal to $$(80-C_{02}-C_{01})\text{ pf.}$$

The series resonance frequency of both crystals would be adjusted to the nominal value at the inflexion temperature with a capacitance of $(80-C_{01})$ picofarads in series. Using the arrangement described here the frequency excursion has been reduced to $\pm3\times10^{-6}$ over the range −40° C. to +85° C.

Although we have described in detail a crystal compensator unit with a linear frequency-temperature characteristic, the invention is not limited to compensator units of this type; the reactance-temperature curve can be amended to specific requirements. For example, with a parabolic frequency-temperature characteristic, a parabolic reactance-temperature curve could be obtained by using half the curve according to FIGURE 4. Thus, a steep parabolic characteristic as in a BT-cut quartz crystal could be used to compensate a shallow parabolic characteristic as in an RT-cut quartz crystal.

Also, the compensating characteristics may be further modified to give the desired frequency correction over a wider temperature range by making the resistor $R_c$ and capacitor $C_c$, shown in the circuit diagrams according to FIGURES 6*b* and 6*c*, temperature sensitive. For example, the compensation of an AT-cut crystal at the ends of the temperature range could be improved.

In addition, more elaborate compensating circuits could be obtained using more than one compensator crystal thus providing further advantages by modifying the system characteristics.

The effects due to change of the overall equivalent series resistance of the device with temperature can be taken care of, if found necessary, by a suitable AGC circuit. The increase in said resistance which reaches a maximum value at the inflexion temperature, depends upon the magnitude of the correction applied and is given by the equation:

$$\Delta\left[\frac{1}{Q}\right]=\frac{\Delta R}{\omega L_1}=\frac{X_0^2}{\omega L_1 R_2}=\frac{2\Delta f}{f} \tag{6}$$

where $\Delta R$=change in equivalent series resistance of device.

In the example previously quoted $$\Delta\left[\frac{1}{Q}\right]$$

is equal to $56\times10^{-6}$ and ΔR is equal to 53 ohms for a $\Delta f/f$ of $28\times10^{-6}$ total. Thus the Q of the device would fall to 18,000 in the absence of any other losses. This is not too serious because the input resistance of a typical oscillator can contribute as much as $10^{-4}$ to the effective $Q^{-1}$ of the crystal.

Although we have described in detail a crystal compensator unit which utilizes quartz crystals, the invention is not limited to compensator units of this type; other types of piezo electric crystals may be employed and the same basic principles would apply.

It is to be understood that the foregoing description of specific examples of this invention is made by way of example only and is not to be considered as a limitation on its scope.

What I claim is:

1. A temperature compensated piezoelectric crystal arrangement comprising:

a first piezoelectric crystal having a given frequency-temperature characteristic which is to be compensated; and a compensating network in series with said first piezoelectric crystal having a generally inverse frequency-temperature characteristic, and comprising a second piezoelectric crystal having a frequency-temperature characteristic which is at least partially inverse to that of the first mentioned piezoelectric crystal, and an RC coupling network which further augments the inverse characteristic of said second crystal.

2. A temperature compensated piezoelectric crystal arrangement according to claim 1 wherein said RC network comprises a resistor in series with said second piezoelectric crystal and a capacitor connected in parallel with the series combination of the second piezoelectric crystal and resistor.

3. A temperature compensated piezoelectric crystal arrangement according to claim 1 wherein said RC coupling network includes temperature sensitive electrical components, thereby further modifying the characteristics of the piezoelectric crystal arrangement to provide the desired frequency correction over a wider temperature range.

4. A temperature compensated piezoelectric crystal arrangement according to claim 1 wherein said second piezoelectric crystal is a quartz crystal.

5. A temperature compensated piezoelectric crystal arrangement according to claim 4 wherein said quartz crystal is an AT-cut crystal for providing a linear frequency-temperature characteristic.

6. A temperature compensated piezoelectric crystal arrangement according to claim 4 wherein said quartz crystal is a BT-cut crystal for providing a parabolic frequency-temperature characteristic.

References Cited

UNITED STATES PATENTS

| | | | |
|---|---|---|---|
| 2,547,133 | 4/1951 | Lowell | 333—72 |
| 3,155,913 | 11/1964 | Prenosil | 333—72 |
| 3,176,244 | 3/1965 | Newell | 331—116 |
| 3,260,960 | 7/1966 | Bangert | 331—116 |
| 3,349,348 | 10/1967 | Ice | 331—116 |
| 3,322,781 | 5/1967 | Brenig | 310—8.9 |

J. D. MILLER, *Primary Examiner.*